(12) United States Patent
Lippey et al.

(10) Patent No.: US 7,535,636 B2
(45) Date of Patent: May 19, 2009

(54) SELECTIVE REFLECTING

(75) Inventors: Barret Lippey, Belmont, MA (US);
Steve O'Dea, Wilmington, MA (US);
Mark Kniffin, Brookline, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 11/548,373

(22) Filed: Oct. 11, 2006

(65) Prior Publication Data

US 2007/0133088 A1 Jun. 14, 2007

Related U.S. Application Data

(60) Continuation of application No. 10/931,608, filed on Sep. 1, 2004, now abandoned, which is a division of application No. 10/028,063, filed on Dec. 21, 2001, now Pat. No. 6,847,483.

(51) Int. Cl.
*G03B 21/56* (2006.01)
(52) U.S. Cl. ........................... 359/443; 359/449
(58) Field of Classification Search .................. 353/20, 353/31; 359/449
See application file for complete search history.

(56) References Cited

U.S. PATENT DOCUMENTS

| | | | |
|---|---|---|---|
| 1,998,054 A | 4/1935 | McBurney | |
| 2,590,906 A | 4/1952 | Tripp | |
| 3,314,742 A | 4/1967 | Morgan | |
| 3,556,640 A | 1/1971 | Austin | |
| 3,712,708 A | 1/1973 | Brown | |
| 3,942,869 A | 3/1976 | Portner et al. | |
| RE29,091 E | 12/1976 | De Palma et al. | |
| 4,190,320 A | 2/1980 | Ferro | |
| 4,206,969 A | 6/1980 | Cobb | |
| 4,312,939 A | 1/1982 | McCole | |
| 4,979,803 A | 12/1990 | McGuckin et al. | |
| 5,148,309 A | 9/1992 | Yamada et al. | |
| 5,164,858 A | 11/1992 | Aguilera et al. | |
| 5,193,015 A * | 3/1993 | Shanks ...................... 349/115 |
| 5,214,530 A | 5/1993 | Coombs et al. | |
| 5,335,022 A | 8/1994 | Braun et al. | |
| 5,361,163 A | 11/1994 | Matsuda et al. | |
| 5,383,995 A | 1/1995 | Phillips et al. | |
| 5,389,982 A | 2/1995 | Lee | |
| 5,400,174 A | 3/1995 | Pagis et al. | |
| 5,416,617 A | 5/1995 | Loiseaux | |

(Continued)

FOREIGN PATENT DOCUMENTS

DE 4442045 5/1996

(Continued)

OTHER PUBLICATIONS

Shimoda, K., "Multi-Layer Dichroic Coating on Plastic Webs," *Proceedings of Thirteenth International Conference on Vacuum Web Coating*, R. Bakish, Ed., pp. 58-67, Tucson, AZ. Oct. 17-19, 1999.

(Continued)

*Primary Examiner*—Christopher Mahoney
(74) *Attorney, Agent, or Firm*—Fish & Richardson P.C.

(57) ABSTRACT

Selective reflective optical apparatus includes a projection screen. The projection screen has structure constructed and arranged to selectively reflect only incident optical energy of a predetermined number of narrow bands of optical wavelength regions.

6 Claims, 12 Drawing Sheets

U.S. PATENT DOCUMENTS

| | | | |
|---|---|---|---|
| 5,473,469 A | 12/1995 | Magocs et al. | |
| 5,486,884 A | 1/1996 | DeVaan | |
| 5,497,207 A | 3/1996 | Kim | |
| 5,526,063 A | 6/1996 | Joubert et al. | |
| 5,568,316 A | 10/1996 | Scheck et al. | |
| 5,570,213 A | 10/1996 | Ruiz et al. | |
| 5,571,624 A | 11/1996 | Phillips et al. | |
| 5,625,494 A | 4/1997 | Fukushima et al. | |
| 5,646,781 A | 7/1997 | Johnson, Jr. | |
| 5,715,083 A | 2/1998 | Takayama | |
| 5,726,805 A | 3/1998 | Kaushik et al. | |
| 5,731,898 A | 3/1998 | Orzi et al. | |
| 5,739,296 A | 4/1998 | Gvon et al. | |
| 5,760,954 A | 6/1998 | Tatsuki et al. | |
| 5,765,934 A | 6/1998 | Okamori et al. | |
| 5,768,019 A | 6/1998 | Niwa et al. | |
| 5,832,146 A | 11/1998 | Bruno | |
| 5,875,012 A | 2/1999 | Crawford et al. | |
| 5,877,895 A | 3/1999 | Shaw et al. | |
| 5,880,800 A | 3/1999 | Mikura et al. | |
| 5,914,817 A | 6/1999 | Browning et al. | |
| 6,018,419 A | 1/2000 | Cobb, Jr. et al. | |
| 6,023,369 A | 2/2000 | Goto | |
| 6,031,653 A | 2/2000 | Wang | |
| 6,072,549 A | 6/2000 | Faris et al. | |
| 6,157,486 A | 12/2000 | Benson et al. | |
| 6,163,402 A | 12/2000 | Chou et al. | |
| 6,183,091 B1 | 2/2001 | Johnson et al. | |
| 6,208,463 B1 | 3/2001 | Hansen et al. | |
| 6,215,592 B1 | 4/2001 | Pelekhaty | |
| 6,248,448 B1 | 6/2001 | Lippey et al. | |
| 6,249,378 B1 | 6/2001 | Shimamura et al. | |
| 6,282,023 B1 | 8/2001 | Bergman | |
| 6,284,382 B1 | 9/2001 | Ishikawa et al. | |
| 6,288,172 B1 | 9/2001 | Goetz et al. | |
| 6,288,842 B1 | 9/2001 | Krasa | |
| 6,307,675 B1 | 10/2001 | Abe et al. | |
| 6,317,189 B1 | 11/2001 | Yuan et al. | |
| 6,339,464 B1 | 1/2002 | Anderson et al. | |
| 6,375,330 B1 | 4/2002 | Mihalakis | |
| 6,381,068 B1 | 4/2002 | Harada et al. | |
| 6,391,068 B2 | 5/2002 | Yoshida et al. | |
| 6,392,766 B1 | 5/2002 | Gnaedig et al. | |
| 6,398,389 B1 | 6/2002 | Bohler | |
| 6,414,727 B1 | 7/2002 | Benton | |
| 6,421,174 B1 | 7/2002 | Ooshima et al. | |
| 6,428,169 B1 | 8/2002 | Deter et al. | 353/20 |
| 6,449,089 B1 | 9/2002 | Moshrefzadeh et al. | |
| 6,525,877 B1 | 2/2003 | Clabburn et al. | |
| 6,529,322 B1 | 3/2003 | Jones et al. | |
| 6,530,667 B1 | 3/2003 | Idaszak et al. | |
| 6,561,654 B2 | 5/2003 | Mukawa et al. | |
| 6,590,710 B2 | 7/2003 | Hara et al. | |
| 6,618,199 B2 | 9/2003 | Cook | |
| 6,648,475 B1 | 11/2003 | Roddy et al. | |
| 6,650,455 B2 | 11/2003 | Miles | |
| 6,674,562 B1 | 1/2004 | Miles | |
| 6,680,792 B2 | 1/2004 | Miles | |
| 6,688,747 B2 | 2/2004 | Wichner et al. | |
| 6,733,139 B2 | 5/2004 | Childers | |
| 6,769,774 B2 | 8/2004 | McDowell | |
| 6,831,784 B2 | 12/2004 | Takeda | |
| 6,847,483 B2 | 1/2005 | Lippey et al. | |
| 6,894,835 B2 | 5/2005 | Ohsako et al. | |
| 6,956,702 B2 | 10/2005 | Pate | |
| 6,969,177 B2 * | 11/2005 | Li et al. | 362/19 |
| 6,988,806 B2 | 1/2006 | Slobodin et al. | |
| 7,035,006 B2 | 4/2006 | Umeya et al. | |
| 7,035,015 B2 | 4/2006 | Teijido | |
| 7,040,764 B2 | 5/2006 | Przybyla et al. | |
| 7,090,357 B2 | 8/2006 | Magarill et al. | |
| 7,234,817 B2 | 6/2007 | Paukshto | |
| 2001/0011779 A1 | 8/2001 | Stover | |
| 2002/0015215 A1 | 2/2002 | Miles | |
| 2002/0024711 A1 | 2/2002 | Miles | |
| 2002/0044445 A1 | 4/2002 | Bohler et al. | |
| 2002/0063350 A1 | 5/2002 | Matsumoto | |
| 2002/0075555 A1 | 6/2002 | Miles | |
| 2002/0043157 A1 | 8/2002 | Miles | |
| 2002/0126354 A1 | 9/2002 | Miles | |
| 2002/0130994 A1 | 9/2002 | Karman | |
| 2002/0145708 A1 | 10/2002 | Childers et al. | |
| 2002/0186349 A1 | 12/2002 | Wichner | |
| 2003/0002016 A1 | 1/2003 | Sellen et al. | |
| 2003/0043346 A1 | 3/2003 | Kwok et al. | |
| 2003/0117704 A1 | 6/2003 | Lippey et al. | 359/443 |
| 2003/0128427 A1 | 7/2003 | Kalmanash et al. | |
| 2003/0128430 A1 | 7/2003 | Leu et al. | |
| 2003/0156326 A1 | 8/2003 | Lotz et al. | |
| 2003/0156328 A1 | 8/2003 | Hiraishi et al. | |
| 2003/0179346 A1 | 9/2003 | Mihara | |
| 2003/0214632 A1 | 11/2003 | Ma et al. | |
| 2004/0061935 A1 | 4/2004 | Obsako | |
| 2004/0150883 A1 | 8/2004 | Shimoda et al. | |
| 2004/0196551 A1 | 10/2004 | Chubachi et al. | |
| 2004/0233524 A1 | 11/2004 | Lippey | |
| 2004/0240053 A1 | 12/2004 | Shimoda | |
| 2005/0030480 A1 | 2/2005 | Lippey | |
| 2005/0105176 A1 | 5/2005 | Lippey | |
| 2005/0207002 A1 | 9/2005 | Liu et al. | |
| 2005/0231800 A1 | 10/2005 | Lippey | |
| 2005/0241530 A1 | 11/2005 | Bruckner et al. | |

FOREIGN PATENT DOCUMENTS

| | | |
|---|---|---|
| DE | 197 47 597 | 8/1998 |
| DE | 19901970 | 8/2000 |
| EP | 0 442 738 A2 | 2/1991 |
| EP | 0 490 391 | 6/1992 |
| EP | 0 493 863 | 7/1992 |
| EP | 0 551 127 | 7/1993 |
| EP | 0 648 048 B1 | 10/1994 |
| EP | 0 609 593 B1 | 2/1995 |
| EP | 0 856 768 A | 5/1998 |
| EP | 0 657 769 B1 | 3/2000 |
| EP | 1 324 114 | 7/2003 |
| EP | 1341387 | 9/2003 |
| GB | 511 199 | 8/1939 |
| GB | 652 859 | 5/1951 |
| GB | 2388992 | 11/2003 |
| JP | 56047012 | 4/1981 |
| JP | 62178906 | 8/1987 |
| JP | H04-219745 | 8/1992 |
| JP | 05011344 A | 1/1993 |
| JP | 05216123 A | 8/1993 |
| JP | 06-43544 | 2/1994 |
| JP | 06 082747 | 3/1994 |
| JP | 06148409 | 5/1994 |
| JP | H07-503348 | 7/1994 |
| JP | 06289491 | 10/1994 |
| JP | HEI 6-289491 | 10/1994 |
| JP | H07-152088 | 6/1995 |
| JP | 7261274 | 10/1995 |
| JP | 07270915 | 10/1995 |
| JP | 07 270 915 | 2/1996 |
| JP | 08186849 | 11/1996 |
| JP | H10-312027 | 11/1998 |
| JP | H11-174232 | 7/1999 |
| JP | H11-119002 | 8/1999 |
| JP | 2001-005412 | 1/2001 |
| JP | 2000-284908 | 2/2001 |
| JP | 2001055646 | 6/2001 |
| JP | 2001-264750 | 9/2001 |
| JP | 2001-305649 | 11/2001 |

| | | | |
|---|---|---|---|
| JP | 2003-50306 A | 2/2003 | |
| JP | 2003-121637 A | 4/2003 | |
| JP | 2003-248108 | 9/2003 | |
| JP | 2003-337381 A | 11/2003 | |
| JP | 2004-004821 | 1/2004 | |
| JP | 2004-029163 A | 1/2004 | |
| JP | 2004-029267 | 1/2004 | |
| JP | 2004-38002 | 2/2004 | |
| JP | 2004/038003 | 2/2004 | |
| JP | 2004/61545 | 2/2004 | |
| JP | 2004-101558 A | 4/2004 | |
| JP | 2004-117480 A | 4/2004 | |
| JP | 2004-138938 | 5/2004 | |
| JP | 2004-144882 | 5/2004 | |
| JP | 2004-144883 | 5/2004 | |
| JP | 2004163806 | 6/2004 | |
| JP | 2004170959 | 6/2004 | |
| WO | WO93/15585 | 8/1993 | |
| WO | WO 95/17690 | 6/1995 | |
| WO | WO 97/01610 | 1/1997 | |
| WO | WO 98/36320 | 8/1998 | |
| WO | WO 00/41009 | 7/2000 | |
| WO | WO 00/45220 | 8/2000 | |
| WO | WO 00/57214 | 9/2000 | |
| WO | WO03/034145 | 4/2003 | |
| WO | WO 03/050612 A1 | 6/2003 | |
| WO | WO 03/077027 A1 | 9/2003 | |
| WO | WO 03/077028 A1 | 9/2003 | |
| WO | WO 2004/031852 A1 | 4/2004 | |

OTHER PUBLICATIONS

Lotz, H. et al., "Thick Optical Multi-Layer Systems on PET Film," *Precision*, Nov. 2001, as printed from http://www.appliedfilms.com/Precision3/14__multilayer__systems/multilayer__systems__print.htm.

Chinese Office Action issued on Jun. 8, 2007, in Chinese Application No. 02157897.4, filed on Dec. 20, 2002.

Http://www.kruschwitz.com/HR's.htm, High reflector designs, Jul. 17, 2003.

Search Report mailed Nov. 7, 2007 in counterpart European application No. 07102106.7 (8 pages).

Partial Search Report mailed May 18, 2007 in counterpart European application No. 07102106.7 (5 pages).

Search Report mailed Jun. 16, 2006 in counterpart application PCT/US2006/000493 (11 pages).

Communication mailed Oct. 18, 2004 in counterpart application European application No. 02102872.5 (4 pages).

Young, Leo, Multilayer Interference Filters with Narrow Stop Bands, Feb. 1967, vol. 6, Applied Optics, pp. 297-312.

Pelletier et al., Interface Filters with Multiple Peaks, Jun. 1982, vol. 72, no. 6 J. Opt. Soc. Am., pp. 683-687.

Jul. 11, 2007, EP Search Report.

Partial European Search Report dated Mar. 20, 2003 from European Application No. 02102872.5.

European Search Report dated May 30, 2003 from European Application No. 02102872.5.

Examination Report dated Mar. 1, 2004 from European Application No. 02102872.5.

EP Examination Report in Application No. 02102872.5, dated May 13, 2005.

Partial European Search Report dated Jun. 14, 2005 from European Application No. 05101098.1.

EP Examination Report in Application No. 05101098.1, dated Oct. 6, 2005.

EP Examination Report in Application No. 02102872.5, dated Mar. 17, 2006.

EP Examination Report in Application No. 05101098.1, dated Feb. 16, 2007.

EP search Report in Application No. 05101103.9, dated Mar. 12, 2007.

European Search Report dated Jul. 17, 2007 from European Application No. 05101103.9.

International Preliminary Report on Patentability in corresponding Application No. PCT/US2006/000493, dated Jul. 10, 2007.

JP Examination Report in Application No. 2002-371849, dated Mar. 27, 2008.

IN Examination Report in Application No. 1064/MUM/2002, dated Apr. 10, 2008.

Examination Report dated May 19, 2008 from European Application No. 05101098.1.

Action and Response History retrieved from PAIR for U.S. Appl. No. 10/028,063, through May 29, 2008.

Action and Response History retrieved from PAIR for U.S. Appl. No. 10/931,608, through May 29, 2008.

Action and Response History retrieved from PAIR for U.S. Appl. No. 11/033,214, through May 29, 2008.

Action and Response History retrieved from PAIR for U.S. Appl. No. 10/893,461, through May 29, 2008.

Action and Response History retrieved from PAIR for U.S. Appl. No. 11/127,531, through May 29, 2008.

Action and Response History retrieved from PAIR for U.S. Appl. No. 10/789,695, through Jun. 3, 2008.

* cited by examiner

FIG. 1

| | Material | Thickness (nm) | | | |
|---|---|---|---|---|---|
| | Si | 6.00 | | NB2O5 | 26.48 |
| | SiO₂ | 3.30 | | NB2O5 | 97.79 |
| 5 | NB₂O₅ | 3.30 | | SIO22 | 97.79 |
| | NB₂O₅ | 50.34 | | SIO22 | 100.00 |
| | SiO₂ | 50.34 | 5 | NB2O5 | 100.00 |
| | SiO₂ | 100.00 | | NB2O5 | 6.01 |
| | NB₂O₅ | 100.00 | | SIO22 | 6.01 |
| 10 | NB₂O₅ | 59.38 | | SIO22 | 35.12 |
| | SiO₂ | 59.39 | | NB2O5 | 35.12 |
| | SiO₂ | 100.00 | 10 | NB2O5 | 28.25 |
| | NB₂O₅ | 100.00 | | SIO2 | 28.25 |
| | NB₂O₅ | 15.15 | | SIO2 | 19.65 |
| 15 | SiO₂ | 15.15 | | NB2O5 | 19.65 |
| | SiO₂ | 99.45 | | NB2O5 | 30.09 |
| | NB₂O₅ | 99.45 | 15 | SIO2 | 30.09 |
| | NB₂O₅ | 43.95 | | SIO2 | 4.27 |
| | SiO₂ | 43.95 | | NB2O5 | 4.27 |
| 20 | SiO₂ | 48.60 | | NB2O5 | 21.91 |
| | NB₂O₅ | 48.60 | | SIO2 | 21.91 |
| | NB₂O₅ | 55.28 | 20 | | |
| | SiO₂ | 55.28 | | | |
| | SiO₂ | 70.29 | | | |
| 25 | NB₂O₅ | 70.29 | | | |
| | NB₂O₅ | 78.38 | | | |
| | SiO₂ | 78.38 | 25 | | |
| | SIO22 | 23.91 | | | |
| | NB2O5 | 23.91 | | | |
| 30 | NB2O5 | 100.00 | | | |
| | SIO22 | 100.00 | | | |
| | SIO22 | 26.48 | | | |

Front View of Entire Screen
FIG. 5B

Side View of One Lens Set
FIG. 5A

FIG. 8A a. Front surface diffuser only

FIG. 8B b. Front surface diffuser and immersed diffuser

1= projector on white screen
2= filtered projector on white screen
3= filtered projector on new screen

FIG. 12

SELECTIVE REFLECTING

CROSS-REFERENCE TO RELATED APPLICATION

This application is a continuation and claims the benefit of priority under 35 USC 120 of U.S. application Ser. No. 10/931,608 of Barret Lippey, Steve O'Dea, and Mark Kniffin entitled SELECTIVE REFLECTING filed Sep. 1, 2004, now abandoned which is a divisional and claims the benefit of priority under 35 USC 120 of U.S. application Ser. No. 10/028,063 of Barret Lippey, Steve O'Dea, and Mark Kniffin entitled SELECTIVE REFLECTING filed Dec. 21, 2001 now U.S. Pat. No. 6,847,483.

The present invention relates in general to selective reflecting and more particularly concerns selective reflecting for front-projection display systems, such as used in home cinema or business applications.

BACKGROUND OF THE INVENTION

For background, reference is made to U.S. Pat. Nos. 5,335,022 and 5,148,309, which relate to polarized screens. One prior art method of increasing contrast ratio is to put neutral density absorption into the screen and appropriately increase the light output from the projector to compensate.

SUMMARY OF THE INVENTION

According to the invention, selective reflecting optical apparatus includes a projection screen having structure constructed and arranged to selectively reflect only incident optical energy of a predetermined number of narrow bands of optical wavelength regions. The structure may comprise a light absorbing material having a chemical composition characterized by absorbing light energy within the region between the narrow bands and may comprise a dye or paint. The light absorbing material may comprise a multilayer interference coating which reflects energy in the narrow bands while transmitting energy in the regions therebetween and a black coating constructed and arranged to absorb the transmitted energy. There is typically a source of projected light constructed and arranged to illuminate the projection screen, the spectral shape of the regions corresponding to that of the source of projected light to effect high reflection of light from the projection screen incident from the source of projected light while absorbing high amounts of ambient light. Typically the narrow bands are approximately blue 430-490 nm, green 540-560 nm, and red 620-650 nm. The bands are typically less than about 10 percent of center wavelength at full width half maximum and may be less than 6 percent of center wavelength.

The multilayer interference coating may comprise a plurality of layers of alternating low index-of-refraction and high index-of-refraction material. A typical low index-of-refraction material is $SiO_2$ and typical high index-of-refraction materials are $TiO_2$, $Ta_2O_5$ and $Nb_2O_5$. The thicknesses of the low index-of-refraction material layers are typically approximately 100 nm and 70 nm for the high index-of-refraction material. Typically, the multilayer interference coating has approximately 5 to 50 layers to form a coating of thickness in the range of approximately 1000 to 6000 nm.

There may be a diffuser on the projection screen constructed and arranged to direct the reflected light to a predetermined viewing location. The diffuser may be constructed and arranged to provide asymmetric diffusion to direct reflected light to a viewing region having a greater span horizontally than vertically.

It is an important object of the invention to provide an improved projection system.

Numerous other features, objects and advantages of the invention will become apparent from the following description when read in connection with the accompanying drawing in which:

DETAILED DESCRIPTION

Figure 1:
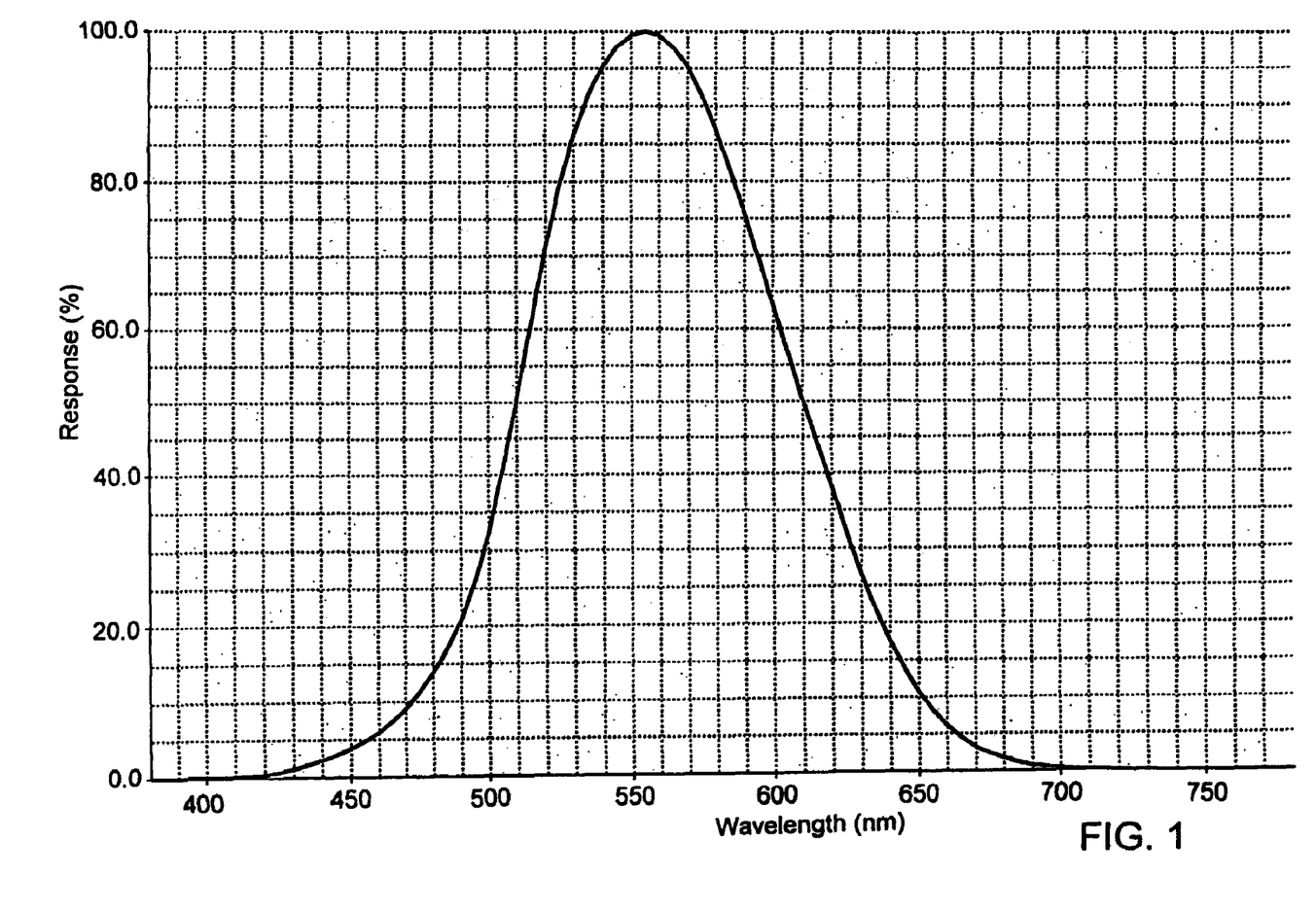
FIG. 1 is a graphical representation of the sensitivity of the human eye to optical energy as a function of wavelength.

With reference now to the drawing, and more particularly FIG. 1, there is shown a graphical representation of the sensitivity of the human eye as a function of optical wavelength, extending from blue at shorter wavelengths to red at longer wavelengths and peaking at green in the center.

Figure 2:
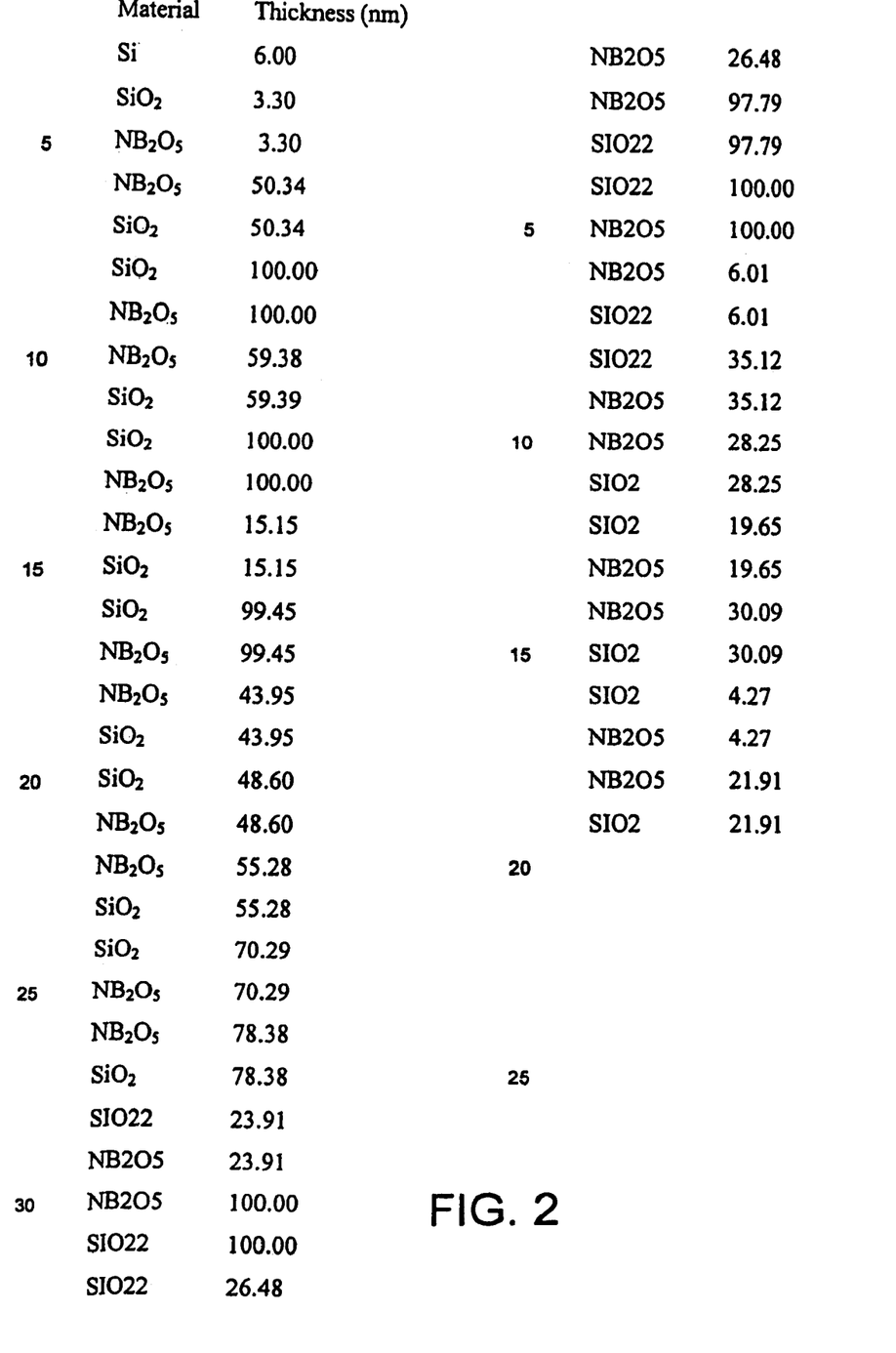
FIG. 2 is a table of an exemplary multilayer coating.

Referring to FIG. 2, there is shown a table illustrating an example of a typical multilayer coating having 26 layers (some layers consisting of 2 sub-layers) of the indicated materials and indicated thicknesses.

The coating in the table of FIG. 2 is constructed and arranged to reflect three spaced narrow bands of optical energy while transmitting and/or absorbing other visible wavelengths. Reflection is typically greater than 90 percent average from 450 to 490 nm, greater than 75 percent average from 540 to 570 nm, and greater than 80 percent average from 610 to 650 nm at zero degrees angle of incidence (AOI). Reflection is typically less than 10 percent average from 500 to 530 nm, less than 20 percent average from 500 to 530 nm and less than 20 percent average from 580 to 600 nm at zero degrees AOI. Reflection is typically less than 50 percent average from 660 to 780 nm at zero degrees AOI.

Figure 3:
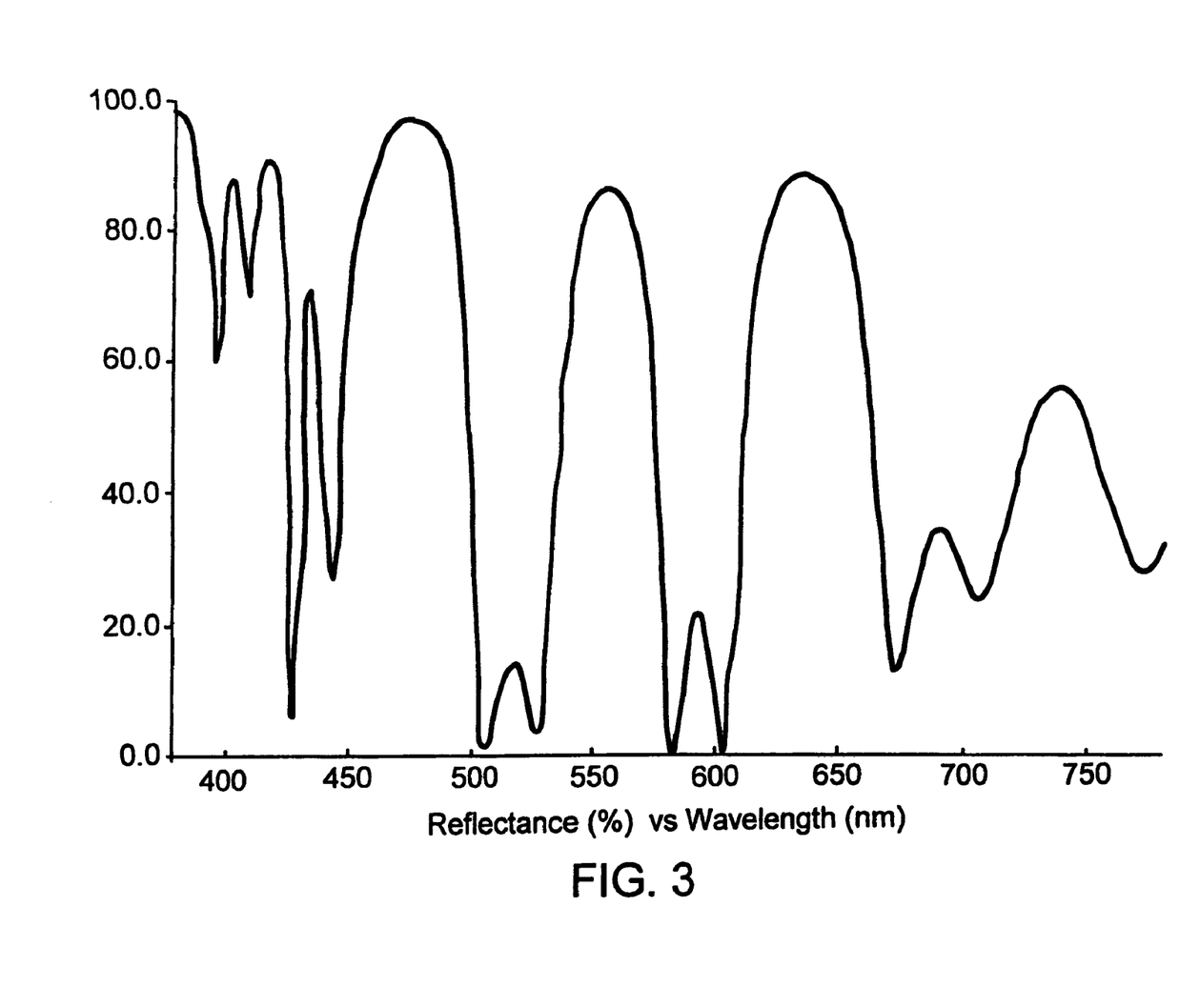
FIG. 3 is a graphical representation of reflectance as a function of wavelength for an exemplary multilayer coating.

Referring to FIG. 3, there is shown a graphical representation of the spectral performance of the coating design shown in FIG. 2.

Figure 4:
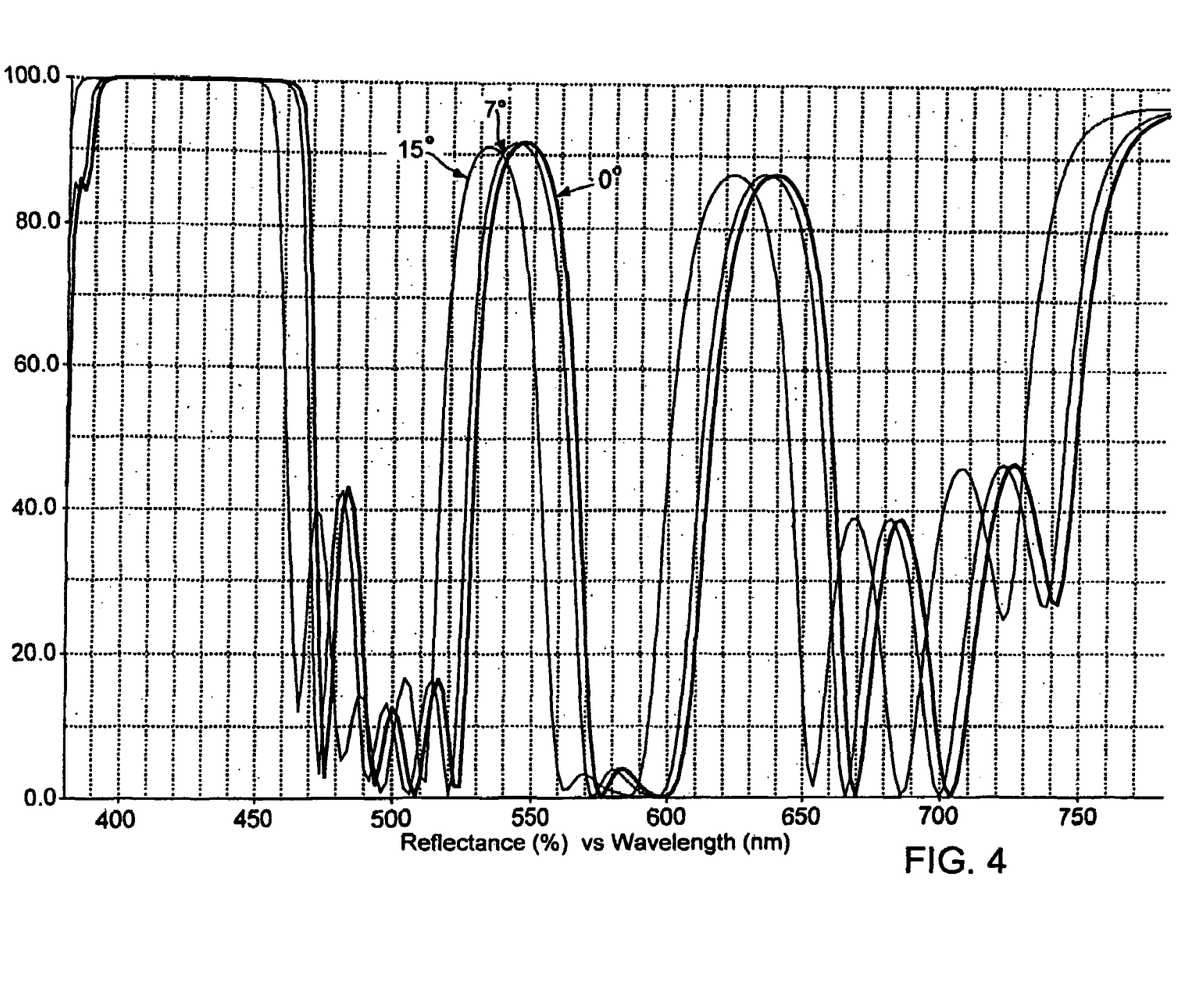
FIG. 4 is a graphical representation of the effect of viewing angle on the reflectance of a typical multilayer coating.

Referring to FIG. 4, there is shown a graphical representation of reflectance as a function of wavelength for angles of incidence of zero degrees, 7 degrees and 15 degrees to illustrate the effect of angle of incidence on reflectance for a typical coating design (not the one listed in FIG. 2).

Figure 5A:
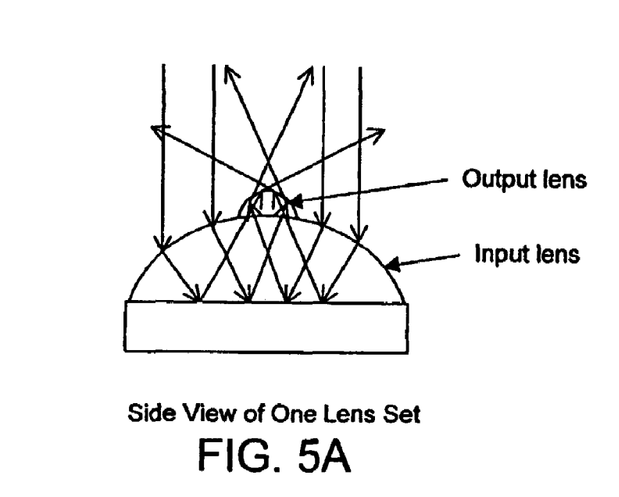
FIG. 5A is a side view of a lens set on a projection screen according to the invention.

Referring to FIG. 5A, there is shown a side view of a lens set on the projection screen having a large input lens 11 and a smaller output lens 12.

Figure 5B:
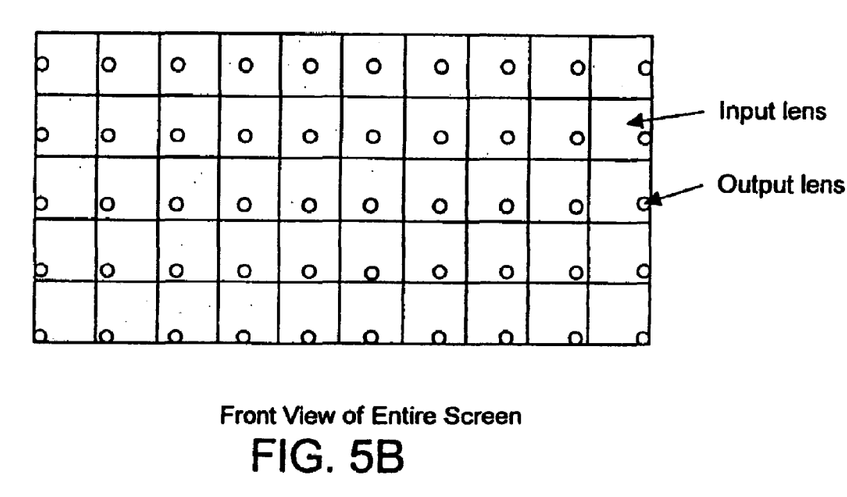
FIG. 5B is a front view of the microlens screen.

Referring to FIG. 5B, there is shown the layout of asymmetric microlenses including an input lens 11 and an output lens 12.

Figure 6:
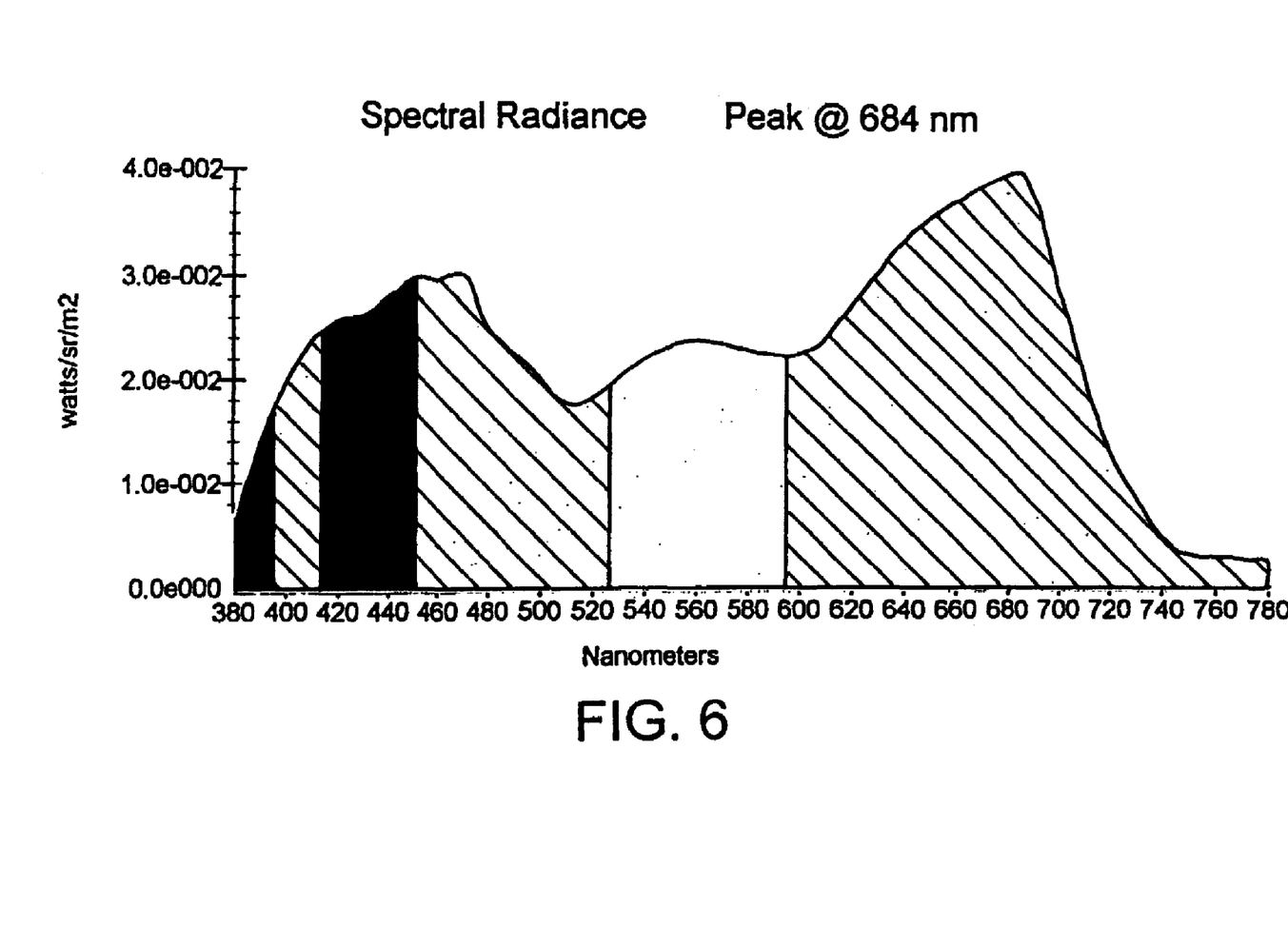
FIG. 6 is a graphical representation of spectral radiance as a function of wavelength for an exemplary dye.
Figure 7:
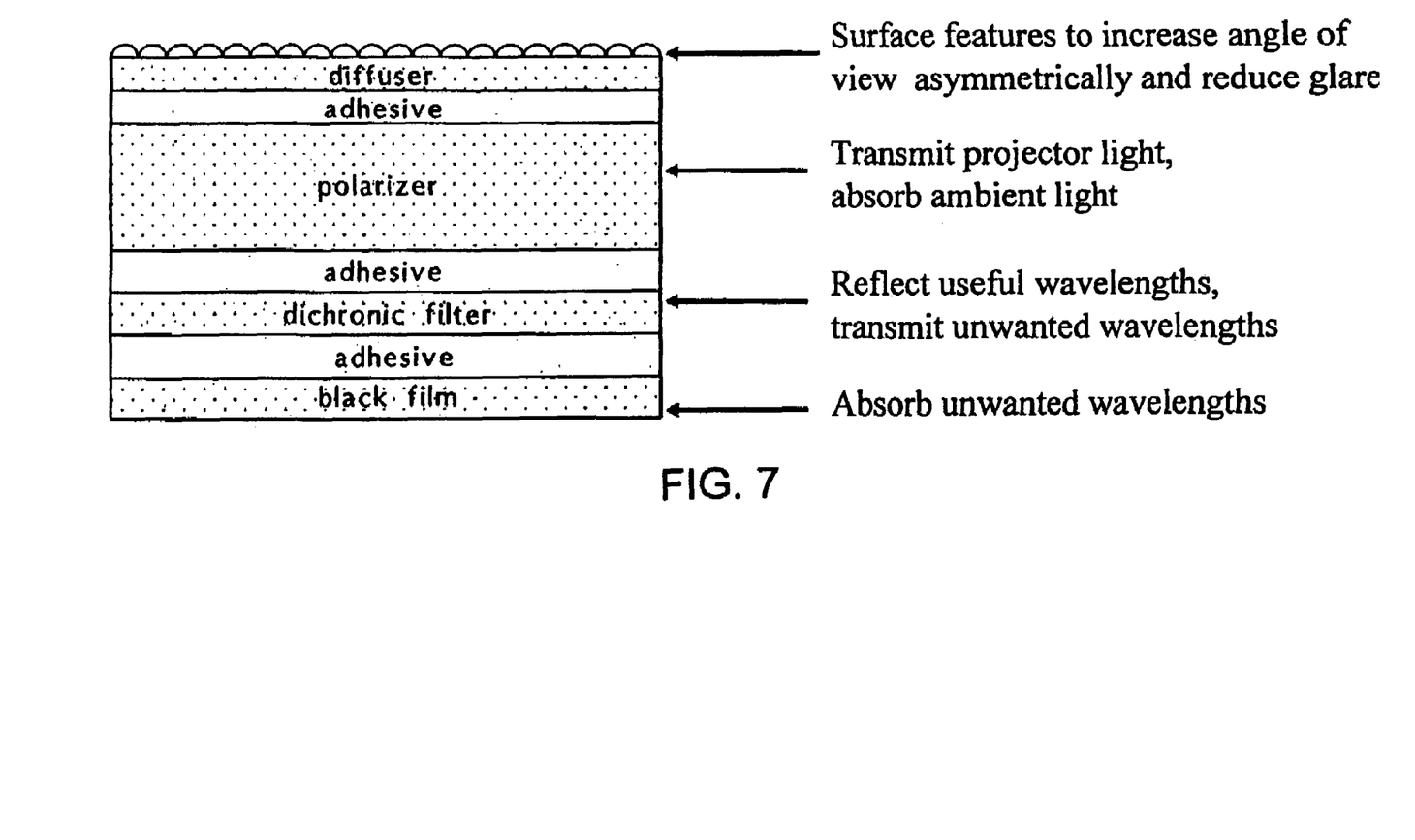
FIG. 7 is a sectional view through an exemplary projection screen according to the invention having a front surface diffuser only.

Referring to FIG. 6, there is shown an example of the spectral radiance of dye as a function of optical wavelength;

Referring to FIG. 7, there is shown a cross section through an exemplary projection screen according to the invention formed of a black film 13 attached by transparent adhesive layer 14 to a dichroic filter layer 15 that reflects useful wavelengths while transmitting unwanted wavelengths to black film 13. Dichroic filter layer 15 is attached by low-birefringence transparent adhesive layer 16 to polarizer layer 17 that transmits the projector light while substantially absorbing ambient light. Polarizer layer 17 is attached by low-birefringence transparent adhesive layer 18 to diffuser layer 19 having surface features to increase the angle of view asymmetrically and reduce glare.

Figure 8A:
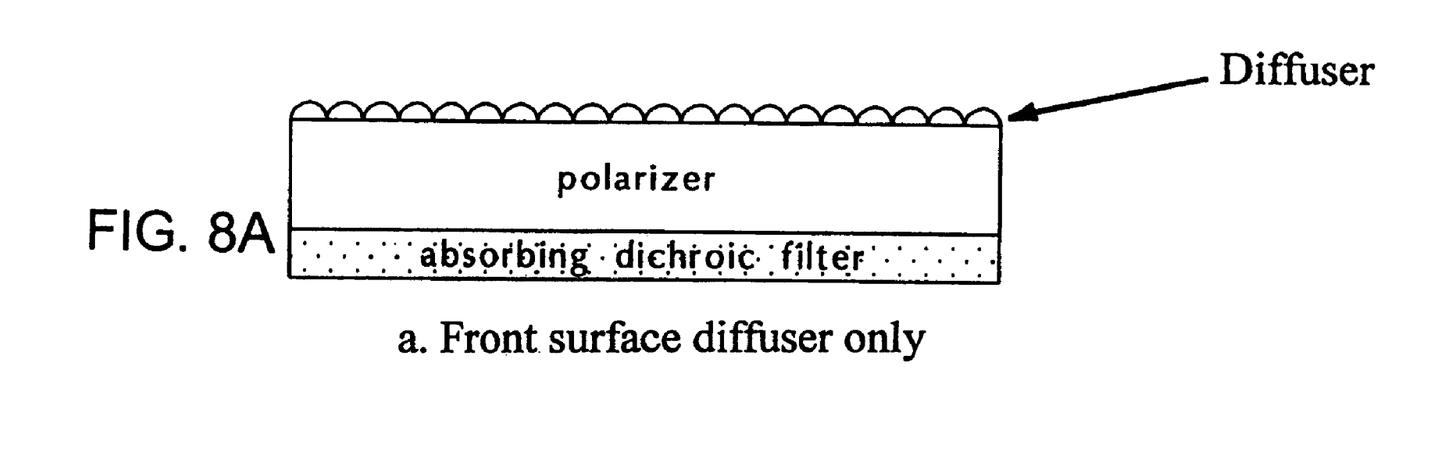
FIG. 8A is a sectional view through an exemplary projection screen according to the invention having a simplified construction.
Figure 8B:
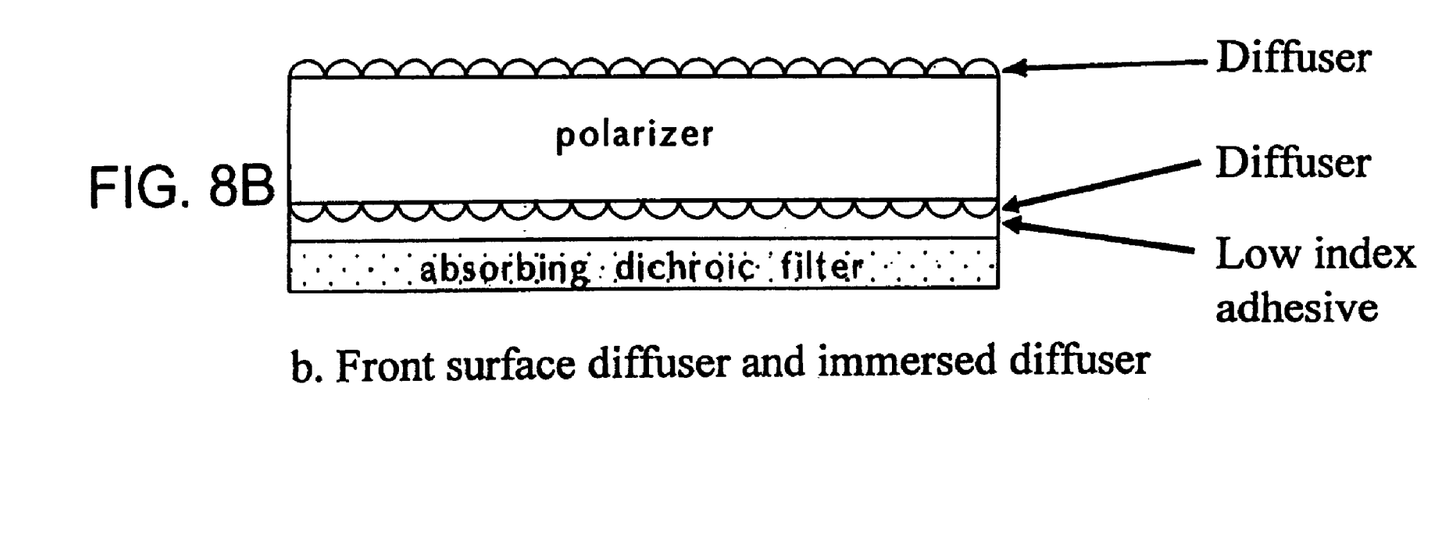
FIG. 8B is a sectional view through an exemplary projection screen according to the invention having both front surface and immersed diffusers.

Referring to FIG. 8, there is shown the cross section of a projection screen according to the invention like that in FIG. 7, except that it includes an immersed diffuser 21 between polarizer 17 and adhesive layer 16.

Figure 9:
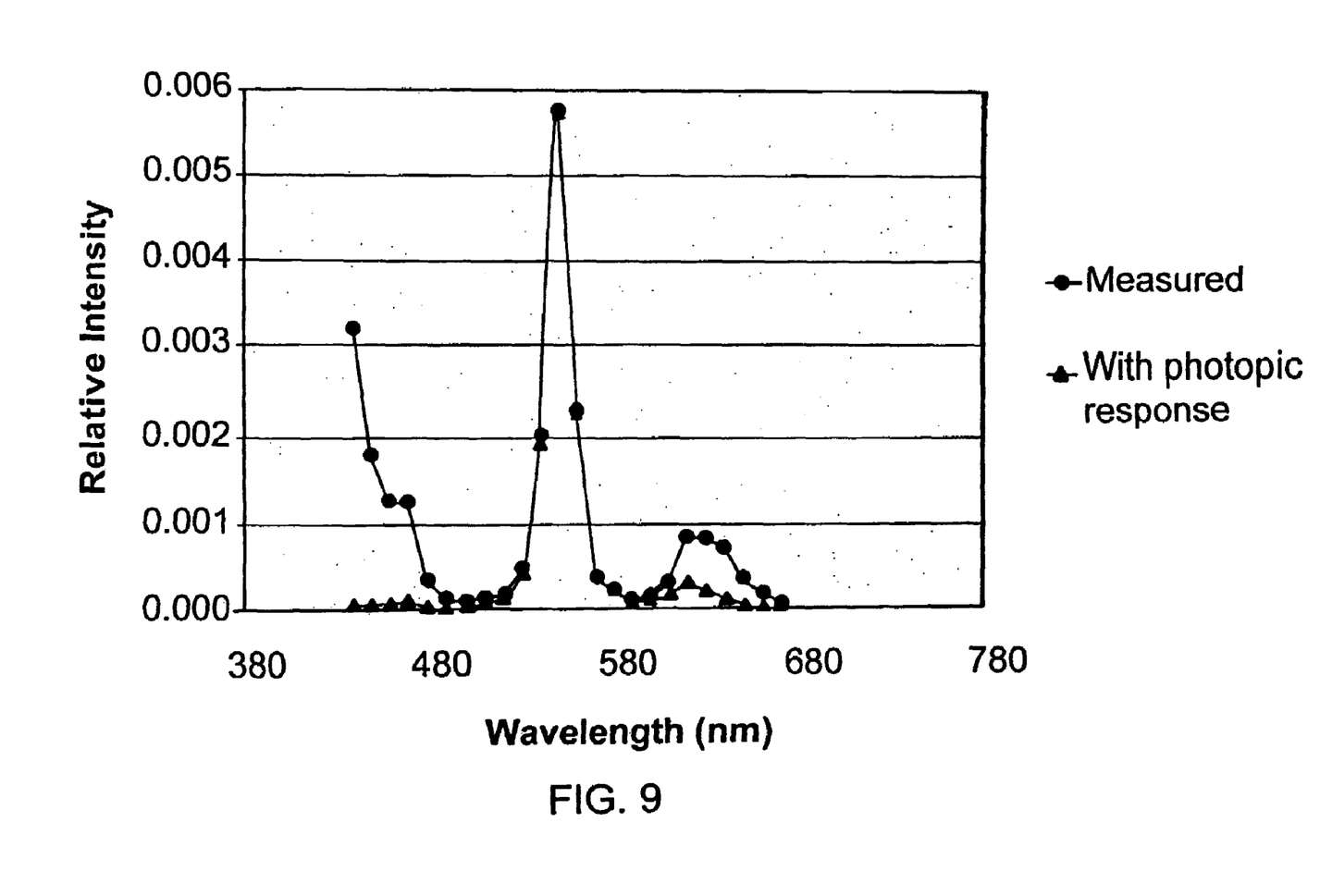
FIG. 9 is a graphical representation of the spectrum of filtered projector light as a function of wavelength.

Referring to FIG. 9, there is shown a spectrum of an exemplary filtered projector light as a function of wavelength having advantages which will be discussed below.

Figure 10:
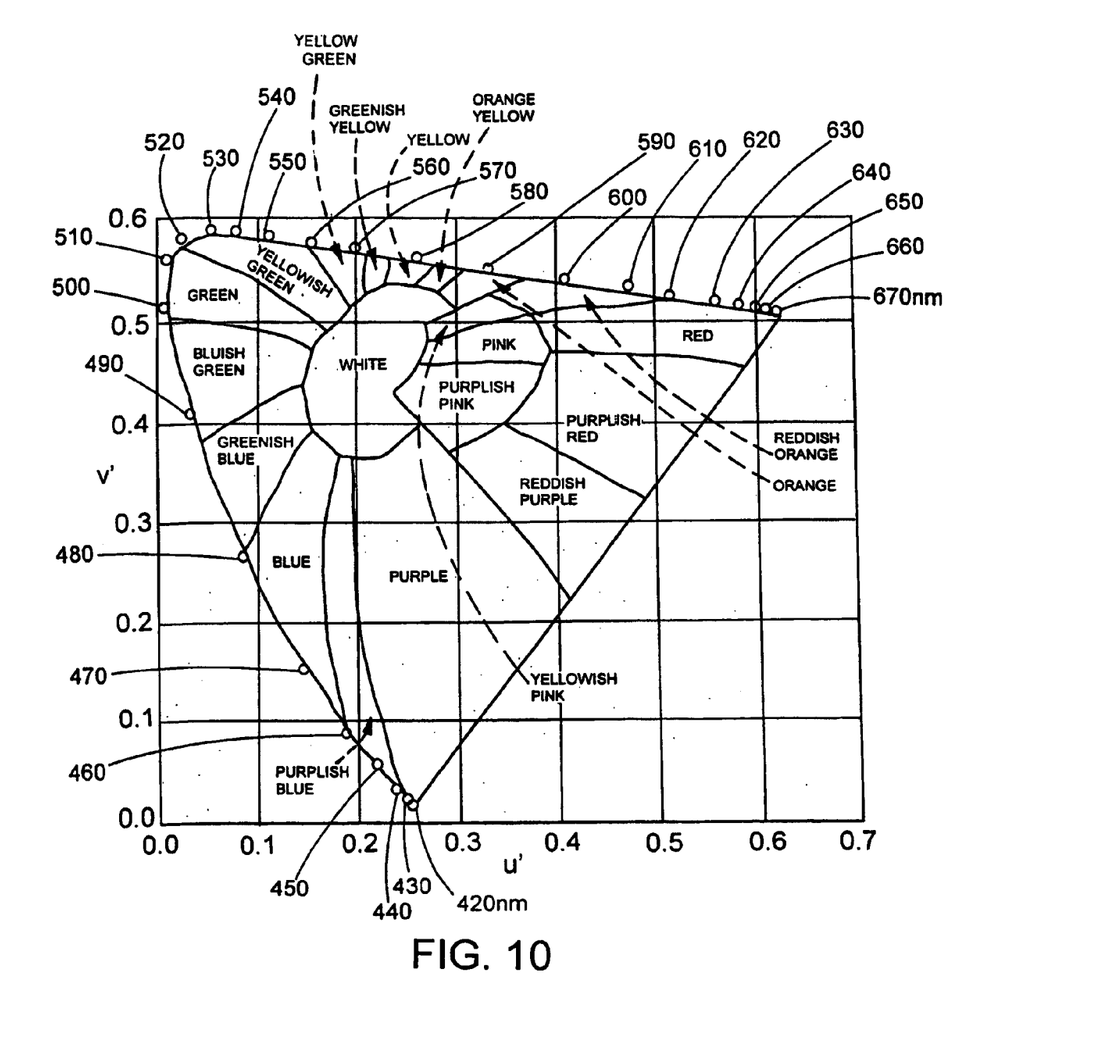
FIG. 10 is a color chart relating optical wavelengths to colors.

Referring to FIG. 10, there is shown a color chart with optical wavelengths for the different colors.

Figure 11:
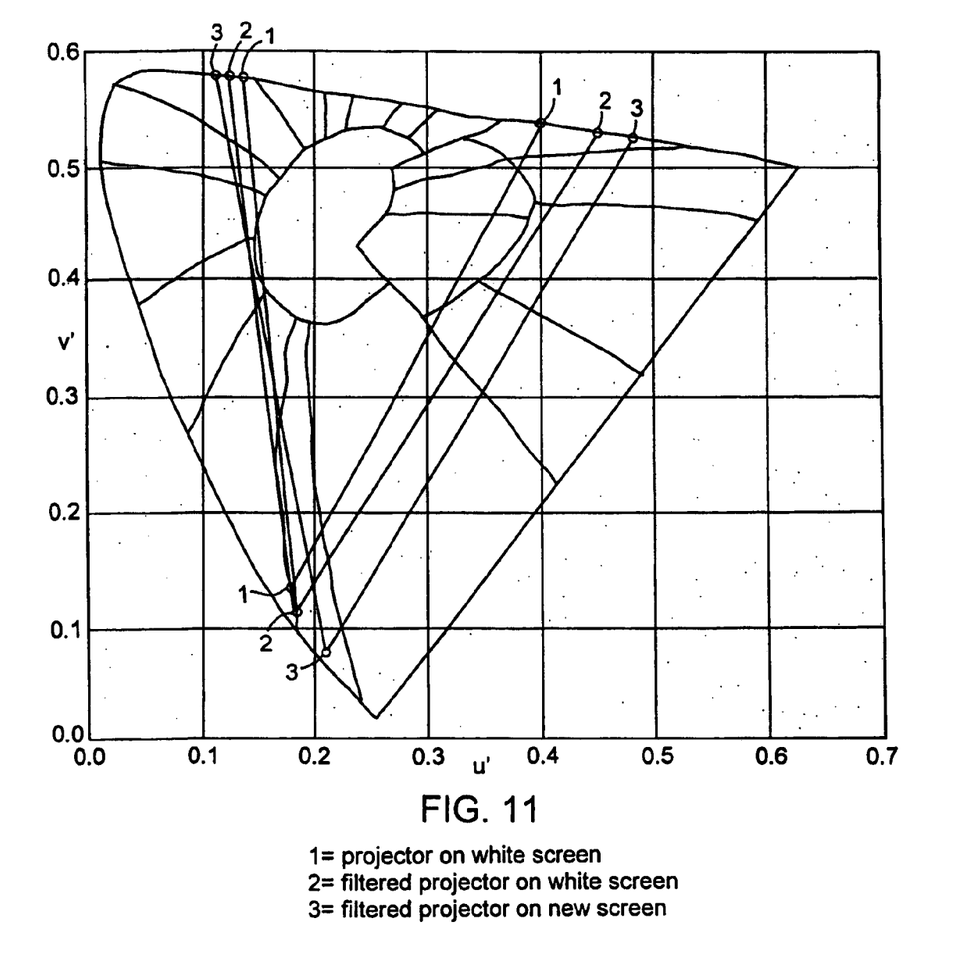
FIG. 11 is a color chart illustrating improved performance achieved with the invention.

Referring to FIG. 11, there is shown a comparison of color performances illustrating improved color performance in progressing from (1) a projector on a white screen, (2) a filtered projector on a white screen, and (3) a filtered projector on the screen according to the invention. Observe that the area of the color triangle embraced by points 3 corresponding to the filtered projector on the screen according to the invention is greater than that of the triangles embraced by points 1 and 2.

Figure 12:
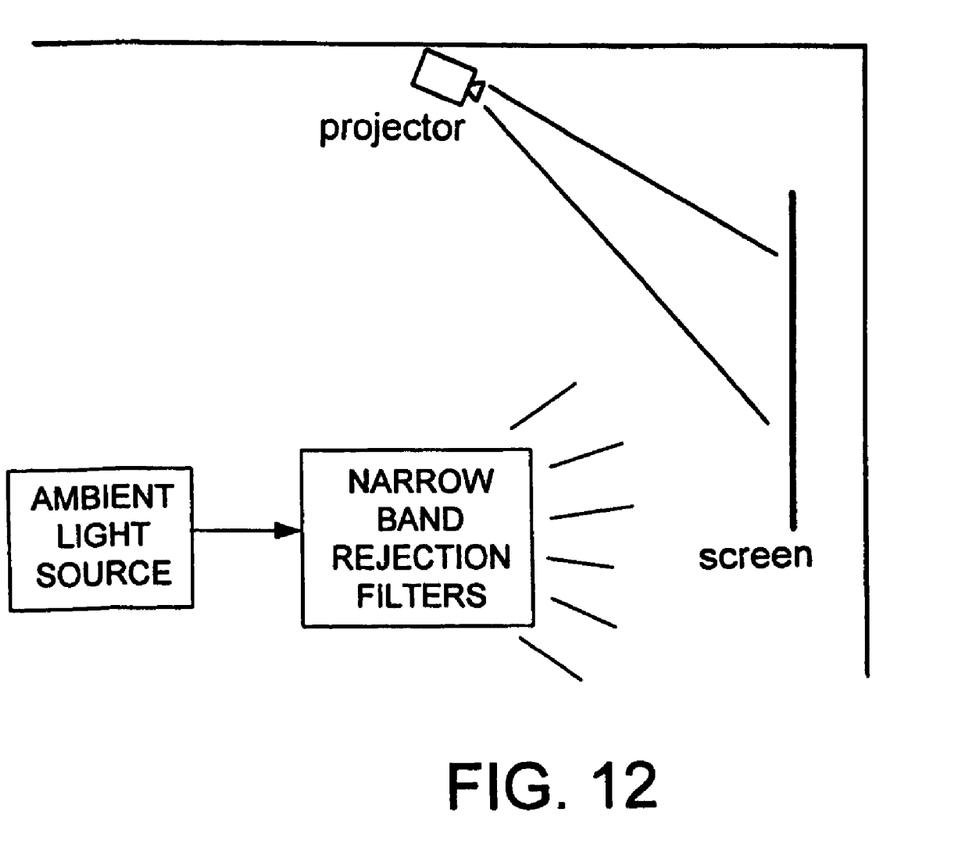
FIG. 12 is an example of filtered waste light.

Referring to FIG. 12, there is shown a schematic example of filtered waste light for the case of a ceiling mounted projector. The light filtered out of the main projector beam is sent out of the projector for the purpose of general room lighting.

Having described certain structural features and optical concepts, it is now appropriate to consider more detailed structural features and advantages of the invention.

The invention provides a high-contrast front-projection video system especially advantageous where there is substantial ambient light, such as in a lighted room. The high-contrast projection screen reflects projector light back to the viewer without reflecting a substantial amount of ambient light from the room. It typically achieves this by (1) reflecting narrow-band peaks of blue, green and red projector light while absorbing light energy of other wavelengths, such as those in the more broadband ambient light spectrum, (2) reflecting light from a polarized projector while absorbing a large percentage of unpolarized ambient light, and (3) steering the reflected projector light from the projection screen into the viewing area by lensing and/or diffusion while not accepting ambient light from off axis. Not only do these features improve contrast ratio, but reflecting the narrow-band peaks of primary colors improves color as shown above.

One approach for achieving wavelength selective reflection is to use a dye or paint which absorbs light energy as a function of wavelength based on its chemical composition. A second approach is to use a multilayer interference coating, such as shown in FIG. 2, which reflects narrow-band blue, green and red while transmitting light energy of other wavelengths. A black coating behind the interference coating absorbs the transmitted energy of other wavelengths. The spectral shape of the wavelength-selectable coating preferably matches the spectral shape of the projector light source and reflects primary colors with high intensity. Matching the spectral shape of the projector light source achieves high reflection of projector light while absorbing high levels of ambient light. By selectively reflecting the primary colors with high intensity there is a larger color gamut effectively achieved by removing yellow contamination in the green, removing orange contamination in the red and moving the blue peak towards the blue corner of the color triangle.

For a color projector based on red-green-blue (RGB), primary colors, wavelength regions for reflection at the screen are preferably approximately (blue) 450-490 nm, (green) 540-570 nm, and (red) 610-650 nm. Making these regions narrower increases the effectiveness of the spectral selectivity. Optical energy of other wavelengths are preferably absorbed at the screen.

An alternate way of describing the wavelength selective property is by the narrowness of the reflection bands. The bands are preferably no wider than approximately 10 percent of center wavelength (at full width half maximum, FWHM) to get at least some contrast improvement. The bands are preferably no wider than 6 percent of center wavelength to get a larger contrast improvement effect. Since the eye is most sensitive to light near its green wavelengths as shown in FIG. 1, these width guidelines apply primarily to the green peak. The width of the red and blue peaks need not be as important.

The multilayer interference coating, also called multilayer dielectric coating or dichroic coating, comprises many layers of alternate low index-of-refraction and high index-of-refraction materials, typically 25, as shown in FIG. 2. These are typically dielectric (nonlight-absorbing) materials which are sputter deposited in a vacuum chamber. A typical low index material is $SiO_2$. Typical high index materials are $TiO_2$, $Ta_2O_5$, and $Nb_2O_5$. By choosing each layer to be the proper thickness, examples being shown in FIG. 2, the small reflections between the layers can be caused to either constructively or destructively interfere as a function of optical wavelength. This structure allows light to be either reflected or transmitted as desired for each wavelength of light energy. Typical thicknesses of the layers are approximately 100 nm average for the low index material and 70 nm average for the high index material. In order to achieve adequately narrow band peaks and valleys according to the invention, there are preferably approximately 5 to 50 layers. The total coating thickness is typically in the range of approximately 1000 to 6000 nm. FIG. 2 shows an example of a multilayer interference coating according to the invention with layer thicknesses. FIG. 3 shows the spectral performance of the design shown in FIG. 2 (without a diffuser).

The optical performance of the dichroic coating is related to the angle of incidence (AOI) of light impinging upon it. FIG. 4 shows the effect of varying the AOI throughout the range of a typical projector-screen geometry. In this example, the projector is typically mounted on the ceiling. The minimum angle is approximately zero degrees and occurs at the upper center of the screen. The maximum angle is approximately 15 degrees and occurs at the lower left and right hand sides of the screens. In actuality, the differences visible across the screen do not vary as much as that shown in FIG. 4, partly because the diffuser tends to average the angles so that all positions have a more similar range of angles.

A variety of methods can be used to reduce the effect of high angle-of-incidence light on the interference coating. The screen can be coated non-uniformly so that each position on the screen has a pre-shifted coating that compensates for the angle of incidence at that position. Another method is to curve the screen so that the angle stays more nearly constant.

The ambient light has a large fraction that comes in at relatively high angles. At high angles, the green peak shifts significantly to the left so that a dip in reflection occurs in the green. Because the eye is more sensitive to green than the other colors, that shift significantly reduces the amount of ambient light seen on the screen and thus helps improve contrast ratio. Another angle-related consideration is the shift at the far right-hand side of FIG. 4. At high angles, the light in the far red (660 to 750 nm) shifts to the near red (630 to 650 nm) and would make the screen look too red overall. By having the coating constructed and arranged to have relatively low reflection in the far red region, this effect is reduced.

The dichroic coating may be made in a small batch process, or using roll-coating machines, using a large roll-coater to make the multilayer interference coating on thin plastic film. The coating may be deposited bidirectionally in pairs of high and low index-of-refraction materials. There may be a constant ratio (determined by the relative deposition speeds) between the thicknesses of the materials in each pair. Each pass through the coating machine allows a variation of coating speed which results in "n" independent variables for coating with "n+1" layers while allowing high deposition speed for all materials at all times.

By using layers of intrinsically absorbing materials (for example, Si and Nb) along with typical dielectric materials, the rear absorbing layer can be eliminated and the coating can be made approximately half the thickness for the same optical effect, thereby reducing cost. Alternately, the coating may be deposited directly on an absorbing substrate or an absorbing layer of material may be deposited directly on the substrate under the dielectric materials.

An alternative method for using an interference coating is to transfer the coating from its original substrate onto the back of another substrate. This allows the elimination of the PET substrate thus making the screen thinner and more rollable. The coating could be transferred to the back of the internal diffuser or to the polarizer, both are typically materials (CTA or polycarbonate) which cannot be interference coated directly due to their outgassing and poor coating adhesion).

Another feature of the high contrast projection screen according to the invention is the diffuser which directs the reflected light to the viewing location. The diffusers may be surface diffusers or textured bulk diffusers. Surface diffusers are typically made by using a holographic or numerically controlled fabricating process to etch a master which is then used to emboss a surface pattern upon a thin, UV-cured coating. Lenticular (cylindrical microlens) patterns function as a diffuser and are advantageous for hiding seams. Bulk diffusers are typically made by mixing together immiscible materials having a slightly different index of refraction such that small particles or lenses are formed in the bulk of the material. A textured front surface can help avoid front surface glare.

Asymmetric diffusion in the horizontal and vertical direction (X and Y) is advantageous because the horizontal direction typically covers more viewing area to account for the horizontal screen geometry and horizontally distributed probability of viewing locations. The bulk or surface diffusion methods can provide asymmetric diffusion in the X and Y directions. Other methods of making asymmetric diffusers include adding oriented glass fibers such that there is an index of refraction difference between the glass fibers and the plastic or adhesive matrix which captures them, adding narrow air chambers such that the air forms cylindrical lenses inside a plastic or adhesive sheet and using a plastic sheet with lines embossed or brushed on the surface.

Asymmetry in the direction of the viewer (z) may also be advantageous and may be achieved with a microlens which focuses the incoming light so that when reflected from the screen, it passes through a relatively small spot having high diffusion or beam spreading, as shown in FIGS. 5A and 5B. This z asymmetry increases the contrast ratio and reduces the effect of large angles on the multilayer interference coating. Z asymmetry may be achieved by continuously varying the microlenses on the screen as a function of their position as shown in FIG. 5B. Another way to achieve z asymmetry is to orient a rough surface of high-index-of-refraction material so that the bumps face away from the projector. This arrangement causes the light exiting from the screen to be diffused less than the light entering the screen. A simple way to make such a screen is to make an air gap internally between the rough surface and the dichroic surface. Another approach is to use a low index-of-refraction adhesive to bond the rough high-index-of-refraction material to form an immersed surface diffuser. Two layers each of low index-of-refraction adhesive (silicone pressure-sensitive adhesive at 1.41) and rough high index-of-refraction material (polycarbonate at 1.58) may be advantageous to achieve sufficient diffusion. Taller bumps or a greater difference in index of refraction may allow sufficient diffusion to be obtained from one layer of immersed diffuser. Another approach to make an immersed diffuser is to use a high-index-of-refraction adhesive and low-index-of-refraction bumps. Thermoplastic adhesives can reach an index-of-refraction as high as 1.71.

The antiglare coating may be made by making a rough or textured surface. A further improvement in glare reduction may be achieved by using a multilayer interference antireflection (AR) coating alone or in combination with the antiglare coating.

Beneficial polarization filtering may be achieved with a linear polarizer in the screen. The projector is polarized preferably in the same direction for all three primary colors. Typical transmissive liquid-crystal-display (LCD) projectors are not polarized this way and may be modified by rotating the green polarization with a ½ wave retarder. In the case of digital-micromirror-device (DMD) projectors, a polarization recovery system may be used to keep high light throughput while making the three primary colors polarized. Another approach is to use a liquid-crystal-on-silicon (LCOS) projector which inherently has the same polarization for all three primary colors.

Polarizing film is typically made by stretching polyvinyl alcohol (PVA) and then dying it to transmit light of one polarization while absorbing light of the other polarization. The polyvinyl alcohol is typically approximately 0.001" thick. On one or both sides, cellulose triacetate (CTA) or cellulose acetate butyrate (CAB) layer is added to protect and strengthen the polarizer. These protective layers are typically at least 0.001" thick each. "Birefringence" is a property of materials that describes a different index of refraction along different orientations of the material. Plastic film materials used in the screen preferably have controlled birefringence to retain proper polarization. To combat uncontrolled birefringence the film may be oriented such that the birefringence does not cause rotation of the polarized light from the projector. Another way is to use substrate materials, such as CTA or CAB, which have very low birefringence. Special adhesive with very low birefringence may also be used. In particular, the diffuser substrate and adhesives in front of the dichroic filter preferably have controlled birefringence. The substrate for the dichroic filter and the adhesive behind the dichroic filter do not need to have controlled birefringence because light passing through these rear materials is discarded.

"Extinction ratio" is a measure of the amount of light passed through two polarizers aligned with their polarization axes aligned perpendicular divided by the amount of light passed through two polarizers aligned with their polarization axes aligned parallel. A modest extinction ratio is acceptable to achieve large benefit from including a polarizer in the projection screen. Low cost polarizers, such as the grades made for sunglasses or toys, are sufficient for the invention.

Another way to achieve spectral selectivity in the screen is to use a phase retarder that is able to control polarization direction as a function of wavelength. The phase retarder can be put in the projector and can consist of one or many elements. Beneficial polarization states are achieved when the red, green, and blue colors are rotated to be (for example) vertical polarization and the other colors are rotated to be horizontal polarization. The polarizer in the screen is oriented so that it selectively allows the reflection of the red, green, and blue while absorbing the other colors. The unpolarized ambient light is partially absorbed so the improvement in contrast ratio and color is similar to that obtained from the multilayer interference coating. This method can be used alone or together with the multilayer interference coating. Phase retarders can also be put in the screen to further modify or enhance the spectral selectivity effects.

Another approach for achieving wavelength selectivity is the use of colorants on one or more layers of the projection screen. Selecting a colorant with specific absorption spectra allows only optical energy of desired wavelengths to be reflected from the projection surface. Since wavelength-absorbing materials are equally effective at a broad range of incident angles, they are advantageous for limiting unwanted ambient light sources in a projection system, where a large range of source angles (from windows, lamps, reflective surfaces and other light sources) are common. An incremental increase in contrast ratio can be achieved by incorporating the colorant as a separate layer in the screen construction or by coloring an existing component (such as the outermost diffusing layer). The colorant may also be used in conjunction with other existing means of wavelength selectability, such as dichroic coatings, to either enhance the filtering quality or to achieve a more desirable apparent color of the final screen product. The reflectance spectra of the colorant need not correspond precisely to the entire range of desired source colors (e.g., narrow band blue, green and red) to improve contrast ratio. For example, a colorant which absorbs unwanted cyan or orange but also absorbs some amount of desired green may yield a net increase in contrast ratio. Color may be achieved by either using organic or synthetic dyes (responsible for absorption only), or pigments (insoluble particles which give rise to some scattering and reflectance). This availability allows a broad range of application, including pretreating polymers used in the screen construction, and surface-coating layers during or after screen construction. FIG. 6 shows the spectral properties of a dye sample that attains some degree of spectral selectivity in the proper wavelengths.

Referring to FIG. 7, there is shown an advantageous embodiment of the invention. The top layer 31 is a holographically-mastered diffuser coating deposited on CTA 32. This layer is then attached with low-birefringence transparent adhesive to a polarizer layer 33 of substantially flat spectral performance. The polarizer layer 33 is then attached with another layer of low-birefringence transparent adhesive to the dichroic filter 34. The dichroic filter 34 typically comprises sputter-coated layers of $SiO_2$ and $Nb_2O_5$ on a polyester terephlate (PET) film. The dichroic filter 34 is attached to a black PET film 36. Typical thicknesses are as follows: 0.003" diffuser, 0.001" adhesive, 0.001" polarizer, 0.001" adhesive, 0.003" dichroic on PET film, 0.001" adhesive and 0.001" black PET. The total thickness is approximately 0.011", which is thin enough to allow the easy rolling and deployment of the screen.

Referring to FIG. 8, there is shown two examples of more advanced versions of the invention characterized by reduced cost and thickness. In FIG. 8A the top layer is a holographically-mastered diffuser coating 41 deposited directly on the polarizer 42. The dichroic filter 43 includes absorbing materials and is deposited directly on the bottom of the polarizer 42. Typical thicknesses are as follows: much less than 0.001" diffuser, 0.003" polarizer, much less than 0.001" dichroic coating. The total thickness is thus approximately 0.003". In FIG. 8B, one layer of immersed surface diffuser is included. Between the extremes shown in FIGS. 7 and 8, various combinations can be realized by incorporating only some of the advanced approaches in FIG. 8.

The construction shown in FIG. 8B puts the diffuser primarily behind the polarizer. This construction results in higher "contrast ratio improvement" (CRI), because ambient light does not have a chance to directly reflect from the diffuser before being partially absorbed in the polarizer. In this embodiment, the top layer bumps are still used to prevent surface glare. The immersed diffuser may be bulk or surface type with X-Y asymmetric properties.

In one form of the invention, it is advantageous to use narrow-band light sources. The sources may be gas or semiconductor diode lasers. Throughout most of this invention description, the wavelengths specified have been based on a specific projector embodiment which uses UHP bulbs to comprise the light source. If a different light source is used, the wavelengths may be adjusted appropriately. In particular, the green wavelength may be shifted to a more purely green color near approximately 520 nm. The output spectrum from a typical projector (with additional filtering that removes the UHP yellow peak), which is appropriate for use with the wavelength selective projection screen, is shown in FIG. 9. UHP bulbs tend to be red poor, so a combination of a UHP bulb with another source of narrow-band red is advantageous. A large number of LEDs may be used to provide the red light. Another source may be a filtered tungsten filament bulb. The CRI may be used as a measure of the effect of the high contrast projection screen according to the invention. With a reasonably narrow-band projector light, typical ultra-high-pressure (UHP) mercury vapor lamp, yellow filtered out, the measured CRI of exemplary high contrast screens range from about 3.5 to about 4.5, depending on the amount of spreading desired. A CRI of 4 is reasonable with typical spreading angles of approximately 45 degrees vertical by 65 degrees horizontal (full angle, half power). These number are for a well-lighted room where a white screen has a contrast ratio of 10 to 1, which makes a picture that is very difficult to see. In that situation, the new system will improve the contrast ratio to approximately 40 to 1, which is a satisfactory level for front projection systems. In a dark room, the invention still provides color improvement and absorbs a significant fraction of the projector's stray light which reflects off the screen and bounces off the walls. That light is largely depolarized when it reflects off the walls, so the polarizer in the screen is still usable in improving contrast ratio. Also, the light that reflects off the walls is largely redirected to high angles where the screen dielectric coating and diffusion layers are constructed and arranged to avoid returning ambient light to the viewer.

The projector can be filtered in order to make a more narrow-band light source. This improves the colors, but at the expense of wasting some light. If this waste light (possibly with additional filtering to make it whiter) is used to light the room as ambient light, it will be mostly absorbed in the wavelength-selectable screen. This arrangement is shown in FIG. 12. Also, the ambient light, such as the room lights or windows can be filtered to only allow wavelengths that will be absorbed in the screen. In the case of room lights, the filter can be directly deposited on the bulb or separately installed in front of the bulb. In the case of windows, the filter coating can be a dye or part of a plastic film such as solar-rejecting window film, or it can be combined with other devices such as curtains.

Referring to FIG. 10, there is shown a color chart with the colors labeled and the corresponding wavelengths indicated. Referring to FIG. 11, there is shown the effect of color improvement. The triangle marked "1" is the color gamut on a white screen produced by a Viewsonic PJ1060 projector (with modified polarization and typical settings for high contrast). The triangle marked "2" shows the color gamut of the same situation except with the addition of a moderately narrow band RGB filter at the output of the projector. The triangle marked "3" shows the color gamut with the further addition of the wavelength selectable projection screen according to this invention. In this example, the addition of the narrow band filter and screen results in a 53 percent improvement in color gamut area.

FIG. 11 shows that this invention has moved the blue point from approximately U'=0.18, V'=0.13 to approximately U'=0.21, V''=0.08. This change represents a shift that makes the blue color become purplish. In order to correct the blue color and to achieve an even larger color gamut, it is advantageous to reduce the reflection in the range of 430 to 450 nm. this reduction can be achieved by appropriate construction of a multilayer coating or by the use of dyes. Changing the blue will tend to degrade the desirable neutral gray or slightly purplish color of the screen when reflecting only ambient light. Other changes, such as a reduction in the amount of green reflection, may be advantageous to keep the proper ambient color.

The high contrast projection screen according to the invention significantly increases the contrast ratio and improves the color. The multilayer interference coating is advantageous in obtaining sharp cut-on and cut-off slopes in wavelength selection. Also, it can be made with arbitrary positions for the cut-ons and cut-offs. This feature allows adjustment for better color and contrast ratio. Colorants such as dyes offer general insensitivity to incoming and outgoing light angles, making them especially advantageous to the projection screen environment.

A variety of methods may be used to reduce the effect of high-angle-of-incidence light on the interference coating. One approach is to coat the screen nonuniformly so that each position on the screen has a preshifted coating that compensates for the angle of incidence at that position. Another approach is to curve the screen so that the angle stays more nearly constant. It is preferred that a lamp of known source spectral power density be matched to a colored screen with the desired emission properties. Other primary color schemes may be used beised RGB to create a full color display. In fact, many colors can be created from a two-primary color system. Another approach is to use only one color to make a monochrome display. The monochrome system can be designed with fewer layers in the dichroic or can be designed to enhance contrast more than in the full color system.

An alternative way to utilize the multilayer interference coatings include the method of removing the coating flakes from the substrate, grinding them into smaller pieces, and putting them into a binder to make paint. The advantages of this method are much improved coating uniformity across the screen and added diffusion from the interference coating flakes that may allow the elimination of the internal diffuser.

It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus comprising:
    a projection screen,
    said projection screen having structure constructed and arranged (i) to selectively reflect only incident optical energy of a predetermined number of narrow bands of optical wavelength regions, and (ii) to significantly attenuate reflection of incident optical energy in bands of optical wavelength regions outside frequency ranges contained in said predetermined number of narrow bands;
    wherein said projection screen comprises a polarizing layer for transmitting light polarized in a given direction and for absorbing light not polarized in said given direction; and
    wherein said structure further comprises a plurality of diffusing layers, which are separate from the polarizing layer.

2. Apparatus in accordance with claim 1, further comprising:
    a source of optical energy for emitting light polarized in the given direction.

3. Apparatus in accordance with claim 2, wherein said source of optical energy comprises:
    a digital micromirror device projector constructed and arranged to provide three primary colors; and
    a polarization recovery system constructed and arranged to provide high light throughput while making the three primary colors polarized.

4. Apparatus in accordance with claim 2, wherein said source of optical energy is configured to light in said predetermined number of narrow bands.

5. Apparatus in accordance with claim 1, further comprising:
    a first diffusing layer in front of the polarizing layer.

6. Apparatus comprising:
    a projection screen, said projection screen having structure constructed and arranged (i) to selectively reflect only incident optical energy of a predetermined number of narrow bands of optical wavelength regions, and (ii) to significantly attenuate reflection of incident optical energy in bands of optical wavelength regions outside frequency ranges contained in said predetermined number of narrow bands;
    wherein said projection screen comprises a polarizing layer for transmitting light polarized in a given direction and for absorbing light not polarized in said given direction;
    wherein said structure comprises a diffusing layer, which is separate from the polarizing layer; and
    said apparatus further comprising layers of dielectric material of alternating high index of refraction and low index of refraction;
    wherein said polarizing layer is between said diffusing layer and said layers of dielectric material.

* * * * *